United States Patent [19]

Gover et al.

[11] Patent Number: 4,661,783
[45] Date of Patent: Apr. 28, 1987

[54] FREE ELECTRON AND CYCLOTRON RESONANCE DISTRIBUTED FEEDBACK LASERS AND MASERS

[75] Inventors: Avraham Gover, Tel Aviv, Israel; Michael E. Read, Vienna, Va.

[73] Assignee: The United States of America as represented by the Secretary of the Navy, Washington, D.C.

[21] Appl. No.: 244,947

[22] Filed: Mar. 18, 1981

[51] Int. Cl.[4] .................... H01J 25/36; H01S 3/00; H03B 9/08
[52] U.S. Cl. .................... 331/82; 315/3.5; 331/94.1; 372/2; 372/37
[58] Field of Search .................... 331/3, 94.1, 79, 81, 331/82; 372/2, 37, 96, 102; 315/3.5

[56] References Cited

U.S. PATENT DOCUMENTS

| | | | |
|---|---|---|---|
| 3,398,376 | 8/1968 | Hirshfield | 372/2 |
| 3,760,292 | 9/1973 | Kogelnik et al. | 372/96 |
| 3,786,368 | 1/1974 | Bjorkholm et al. | 372/96 |
| 3,822,410 | 7/1974 | Madey | 372/2 X |
| 3,868,589 | 2/1975 | Wang | 372/96 |
| 3,884,549 | 5/1975 | Wang et al. | 372/96 X |
| 3,898,585 | 8/1975 | Heidrich et al. | 372/96 |
| 3,906,393 | 9/1975 | Fletcher et al. | 372/96 |
| 3,958,188 | 5/1976 | Fletcher et al. | 372/96 |
| 3,970,958 | 7/1976 | Streifer et al. | 372/96 |
| 3,970,959 | 7/1976 | Wang et al. | 372/96 |
| 3,972,008 | 7/1976 | Fletcher et al. | 372/96 |
| 4,096,446 | 6/1978 | Haus et al. | 372/96 |
| 4,345,329 | 8/1982 | Doucet et al. | 372/2 |

OTHER PUBLICATIONS

Bekefi et al., "Stimulated Raman Scattering by an Intense Relativistic Electron Beam Subjected to a Rippled Electric Field," Journal of Applied Physics, vol. 50, No. 8, Aug. 1979, pp. 5158-5164.

Primary Examiner—Siegfried H. Grimm
Attorney, Agent, or Firm—John L. Forrest; Alan P. Klein

[57] ABSTRACT

Free-electron lasers and masers are modified by eliminating the resonator cavity as such. The feedback mechanism, essential to oscillation, is distributed through and integrated with the transmission line which guides the electromagnetic wave at the active region where interaction with the electron beam takes place. The feedback structure is created by perturbations in the transmission line along the length thereof at the locations of the zero electric field lines of a desired oscillatory standing wave mode. The perturbations may take the form of axial, helical, and azimuthal deformation of the transmission line.

11 Claims, 7 Drawing Figures

FREE ELECTRON AND CYCLOTRON RESONANCE DISTRIBUTED FEEDBACK LASERS AND MASERS

BACKGROUND OF THE INVENTION

This invention relates generally to particle-resonant-type oscillators, and more particularly to oscillators which produce radiation by direct conversion of the kinetic energy of an electron beam to radiative energy.

Many fundamental effects involving radiative emission from electron beams have been discovered and investigated, leading to the development of a whole class of free electron lasers and masers. Some of these effects are the Cerenkov radiation (emission from electrons passing in or near a dielectric material), bremsstrahlung (emission from decelerated electrons), Smith-Purcell radiation (emission from electrons passing near an optical grating) and cyclotron resonance radiation (emission from electrons in a uniform magnetic field).

Any electromagnetic oscillator must use a resonator structure to provide the feedback for oscillation. Electromagnetic wave oscillators (lasers or masers) based on the above effects are usually operated with a conventional Fabry-Perot resonator in the optical wavelength regime, or with a conventional cylindrical microwave cavity in the near millimeter and microwave regimes. These resonator structures have the following disadvantages:

(a) In order for the electron beam to enter the active region where the interaction between the electron beam and an electromagnetic wave takes place, the electron beam is usually magnetically deflected around the resonator mirrors (in the optical case) or a hole is opened in the front and end reflectors (in the microwave-near mm region). Both solutions degrade the operation of the device and introduce technological difficulties.

(b) When very short electron beam pulses are used, the effective Q factor of conventional Fabry-Perot resonators is low because the electromagnetic wave can traverse back and forth along the resonator only few times before the electron beam pulse passes entirely through the resonator and the gain stops.

(c) Conventional resonators usually may support many modes, particularly when the dimensions of the resonator are large relative to a wavelength. This causes a wide angular spread of the emitted radiation, lack of monochromaticity and coherence, and reduced efficiency.

(d) Specifically, for the cyclotron resonance maser (gyrotron), mode selection is made by use of a small cavity close to the wavelength dimension (~cm). This is possible because of the very high gain (growth rate) available and because the cross section of the beam can easily be made small relative to a wavelength. When higher frequency operation is desirable and particularly when one would like to operate at high harmonics of the cyclotron resonance frequency, it is difficult to use cavity dimensions which are small compared to a wavelength both because of the shorter wavelength of the radiation and the low growth rate encountered in harmonic operation. Furthermore, the large cavity can simultaneously support waves at the desirable high harmonic frequency together with lower harmonic frequencies. In this case the lower harmonic frequency (which usually is endowed with a higher growth rate) dominates the mode competition process in the laser and extracts most of the available electron beam energy.

Thus it is not possible to get efficient operation at high harmonic frequencies. Operation at high harmonic frequencies is desirable not only to get short wavelengths (near mm. regime) but also to permit the use of permanent magnets instead of high-induction superconducting magnets. The latter suffer the disadvantages of being expensive, cumbersome, and require liquid helium cooling.

SUMMARY OF THE INVENTION

Accordingly, it is an object of the present invention to improve the operation of oscillators which produce radiation by direct conversion of the kinetic energy of an electron beam to radiative energy.

Another object is to provide a highly selective distributed feedback resonator for incorporation with such oscillators in place of the resonator cavity as such.

The objects of the present invention are achieved by an improvement in an electromagnetic wave oscillator of the type which produces radiation by direct conversion of an electron beam to radiative energy. Such oscillators typically include an active region where an interaction between the electron beam and an electromagnetic wave takes place, and a transmission line for guiding the electromagnetic wave at the active region. The improvement comprises means for perturbing the transmission characteristics of the transmission line along the zero electric field lines of a standing wave mode at which the oscillator is desired to operate. The perturbation provides a high Q factor to the desired wave mode and a low Q factor to other wave modes which may compete with the desired wave mode. It also forces the desired wave mode to form a nearly standing wave pattern which provides the feedback mechanism of the oscillator. The resulting transmission line structure forms a distributed feedback resonator having high mode and frequency selectivity.

It is apparent that such a resonator which leaves the front and back planes of the transmission line clear allows easy coupling of the electron beam in and out of the active region, thus avoiding the problems associated with prior art resonators. Since the oscillator feedback is provided inside or next to the active region which is relatively short, the oscillator can operate efficiently with a short pulsed electron beam. The mode selectivity of the resonator is much higher than that of conventional resonators. Discrimination of second harmonic frequencies in a high power, large cavity gyrotron can also be readily obtained with the resonator.

Additional advantages and features will become apparent as the subject invention becomes better understood by reference to the following detailed description when considered in connection with the accompanying drawings, wherein:

BRIEF DESCRIPTION OF THE INVENTION

Figure 1:
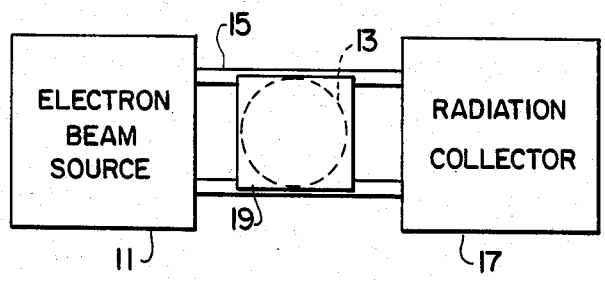
FIG. 1 is a schematic block diagram of an electromagnetic wave oscillator incorporating the device of the present invention.

The invention as illustrated in FIG. 1 incorporates an electromagnetic wave oscillator of the type which produces radiation by direct conversion of the kinetic energy of a an electron beam to radiative energy. Since such oscillators are known in the free-electron laser and maser art (examples being magnetic bremsstrahlung lasers, Cerenkov and Smith-Purcell lasers, cyclotron resonance masers, etc.) and the detailed operation thereof is well understood in the art, the electromagnetic wave oscillator will be described only insofar as necessary to set forth the cooperative relationship of the device of the present invention.

The electromagnetic wave oscillator includes an electron beam source 11 which directs a beam of electrons into an active region 13 where an interaction between the electron beam and an electromagnetic wave takes place. The kinetic energy of the electron beam is converted by stimulated emission to radiative energy which is given up to a transmission line 15 which guides the electromagnetic wave at the active region, and the radiation is collected at a radiation collector 17.

According to the invention, perturbing means 19 is provided for perturbing the transmission characteristics of the transmission line 15 along the zero electric field lines of a wave mode at which the oscillator is desired to operate. The resulting transmission line structure forms a distributed feedback resonator having high mode and frequency selectivity. By perturbing the transmission line 15 in this manner, a high Q factor is provided to the desired wave mode, and a low Q factor is provided to the other wave modes which may compete with the desired wave mode.

Figure 2:
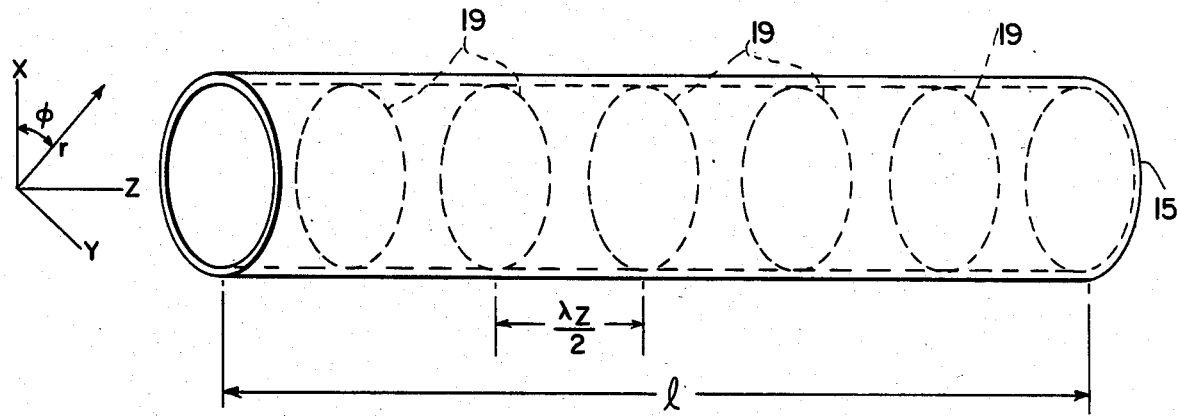
FIG. 2 is a detailed schematic diagram of a first embodiment of the distributed feedback resonator.

A first specific embodiment of the distributed feedback resonator is shown in FIG. 2. For illustrative purposes, the transmission line 15 is assumed to be a cylindrical waveguide whose length l is greater than the axial wavelength $\lambda_z$ of the wave mode at which the oscillator is desired to operate. As used herein, the term "axial wavelength" refers to the quantity $(2\pi/k_z)$, where $k_z$ is the axial wave number of the wave mode. Perturbing means 19 may comprise any azimuthal deformation of the waveguide wall whose axial coordinate satisfies the relation $$z = L_n$$

where $L_n = n(\lambda_z/2)$ n=1, 2, 3, ... (z is measured from the input plane of the waveguide). The deformation may include, for example, any of the following elements periodically spaced apart in the z direction by half the axial wavelength at which the oscillator is desired to operate: corrugations of the waveguide wall, or highly conductive fins, lossy wires, lossy ribbons, etc. disposed on the waveguide wall. The more the number of such elements, the more effective the resonator. The periodic perturbation of the waveguide transmission characteristic provides feedback (i.e., a high Q factor) by the mechanism of Bragg reflection to the wave mode of axial wavelength $\lambda_z$. Stated otherwise, the periodic perturbation favors the formation of a (nearly) standing wave mode with electric field nodes at the coordinates of the deformation. The other wave modes, which have a finite electric field strength at the coordinates of the deformation, suffer absorption or high ohmic losses or are transmitted well outside the active region 13 (have low standing wave ratio in the active region) and consequently lose in the mode competition in favor of the desired wave mode (provided that the net gain of the latter is highest).

Figure 3:
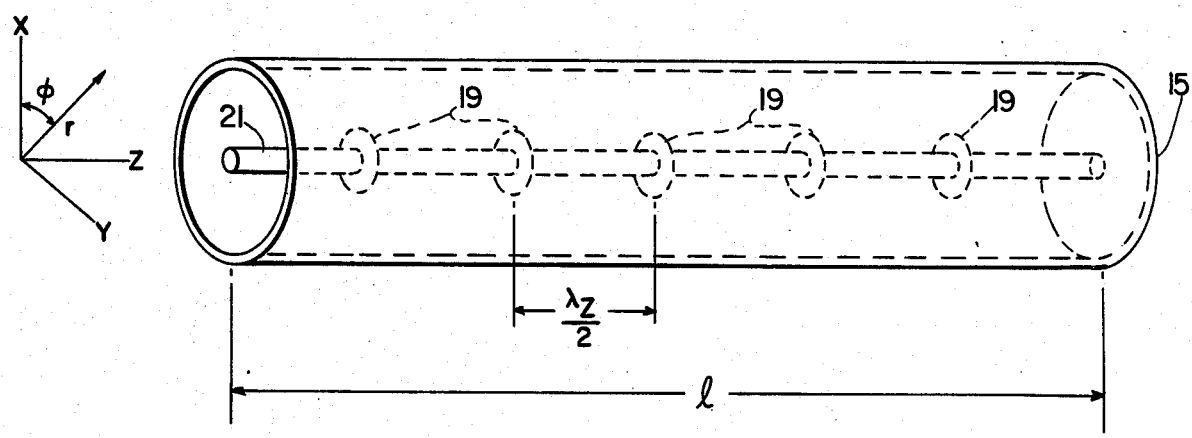
FIG. 3 is a detailed schematic diagram of a second embodiment of the distributed feedback resonator.

A second specific embodiment of the distributed feedback resonator is shown in FIG. 3. For illustrative purposes, the transmission line 15 is assumed to be a coaxial line whose length l is greater than the axial wavelength $\lambda_z$ of the wave mode at which the oscillator is desired to operate. Perturbing means 19 may comprise any azimuthal deformation of the center conductor 21 whose axial coordinate satisfies the relation $$z = L_n$$

where $L_n = n(\lambda_z/2)$ n=1, 2, 3, ... (z is measured from the input plane of the coaxial line). The deformation may include, for example, any of the following elements periodically spaced apart in the z direction by half the axial wavelength at which the oscillator is desired to operate: corrugations of the center conductor surface, or highly conductive fins, lossy wires, lossy ribbons, etc. disposed on the center conductor. The more the number of such elements, the more effective the resonator.

Figure 4:
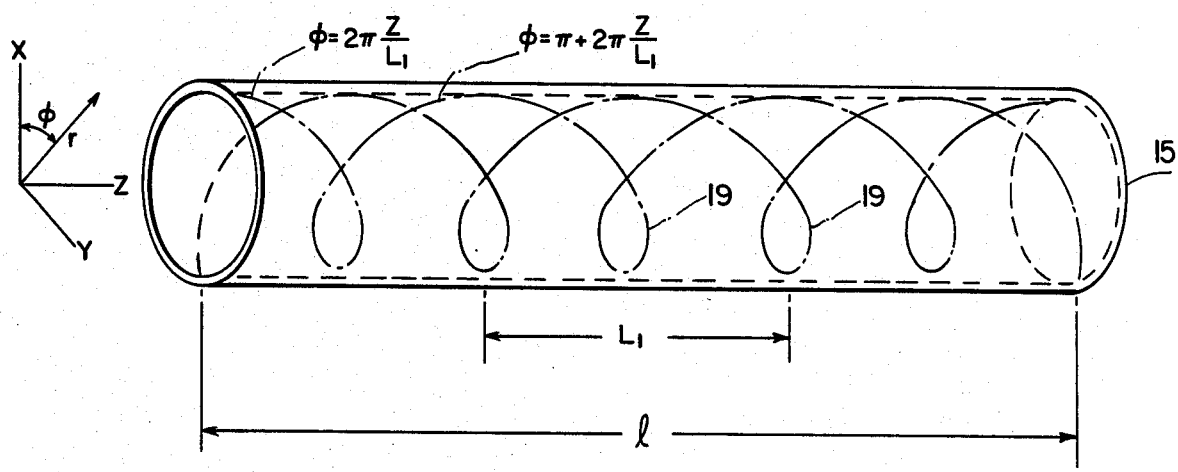
FIG. 4 is a detailed schematic diagram of a third embodiment of the distributed feedback resonator.

A third specific embodiment of the distributed feedback resonator is shown in FIG. 4. For illustrative purposes, the transmission line 15 is assumed to be a cylindrical waveguide. Perturbing means 19 may comprise any helical deformation of the waveguide wall whose azimuthal coordinate $\phi$ and axial coordinate z satisfy the relation $$\phi = \frac{m\pi}{n} + 2\pi \frac{z}{L_n}$$

where n=1, 2, 3, ...
m=0, 1, 2, ..., 2n−1
and $L_n = n\lambda_z$ with $\lambda_z$ the axial wavelength of the wave mode at which the oscillator is desired to operate. (z is measured from the input plane of the waveguide.) The deformation may include, for example, corrugations of the waveguide wall or highly conductive fins, lossy wires or lossy ribbons disposed on the waveguide wall, forming a plurality of interlaced helices. Discrimination between different azimuthal modes may be achieved by selecting a specific value of n, the azimuthal mode number. FIG. 4 illustrates the case for resonating the n=1 azimuthal mode.

Figure 5:
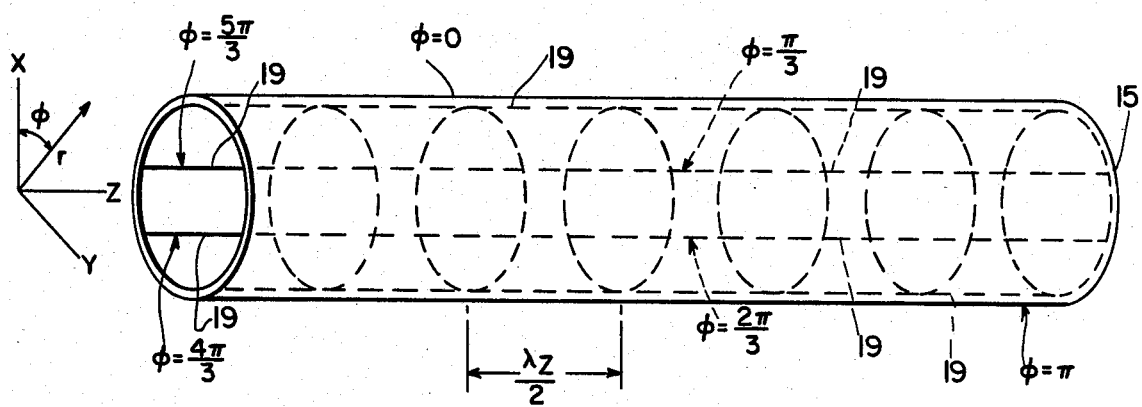
FIG. 5 is a detailed schematic diagram of a fourth embodiment of the distributed feedback resonator.

A fourth specific embodiment of the distributed feedback resonator is shown in FIG. 5. For illustrative purposes, the transmission line is assumed to be a cylindrical waveguide whose length l is greater than the axial wavelength $\lambda_z$ of the wave mode at which the oscillator is desired to operate. Perturbing means 19 may comprise any axial deformation of the waveguide wall whose azimuthal coordinate satisfies the relation $$\phi = m\pi/n$$

where n = 1, 2, 3, ...
m = 0, 1, 2, ..., 2n−1, in combination with an azimuthal deformation of the waveguide wall whose axial coordinate satisfies the relation $$z = L_p$$

where $L_p = p(\lambda_z/2)$, p = 1, 2, 3, ... (z is measured from the input plane of the waveguide). Both deformations may include, for example, corrugations, highly conductive fins, lossy wires or lossy ribbons. The elements of the axial deformation are periodically spaced apart in the z direction by half the axial wavelength at which the oscillator is desired to operate. The elements of the azimuthal deformation are periodically spaced apart in the $\phi$ direction by $\pi/n$. Discrimination between different azimuthal modes may be achieved by selecting a specific value of n, the azimuthal mode number. FIG. 5 illustrates the case for p = 1, n = 3.

In any of the above embodiments of the distributed feedback resonator the deformations can extend along the length of the entire active region 13 or beyond it in either direction. The deformations can also be located outside the active region 13 and not inside it at all in which case the resonator will operate as a Bragg reflection resonator which provides high feedback to a specific electromagnetic mode by reflecting it at the ends of the active region back into the active region. Emission of electromagnetic radiation predominantly in one direction can be obtained by extending the deformations out of the active region 13 on the side opposite the emission direction.

Figure 6:
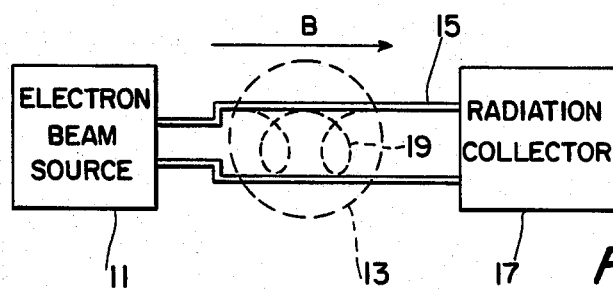
FIG. 6 is a schematic block diagram of a gyrotron incorporating the distributed feedback resonator.

Referring to FIG. 6, the distributed feedback resonator is shown incorporated with a gyrotron or cyclotron resonance maser as described, for example, in U.S. Pat. No. 3,398,376 issued to J. L. Hirshfield on Aug. 20, 1968, and herewith incorporated by reference. The gyrotron typically includes an electron beam source 11 which directs an electron beam having a high transverse component of kinetic energy into an active region 13 which is immersed in a uniform longitudinal magnetic field B. The kinetic energy of the electron beam is converted by stimulated emission to radiative energy which is given up to a cylindrical waveguide 15 which guides the electromagnetic wave at the active region 13 and the radiation is collected at a radiation collector 17. Since, in practice, the active region 13 does not contain many wavelengths $\lambda_z$ and azimuthal mode selection is desirable, the resonator illustrated in FIG. 4 (helical deformation) is used in preference to any other embodiment thereof.

Figure 7:
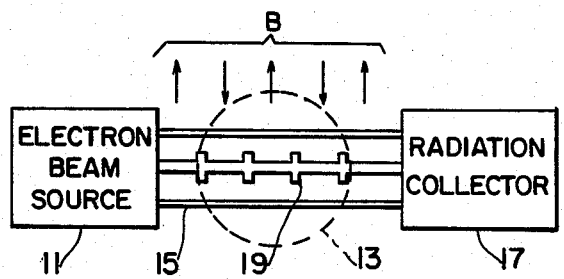
FIG. 7 is a schematic block diagram of a magnetic bremsstrahlung laser incorporating the distributed feedback resonator.

Referring to FIG. 7, the distributed feedback resonator is shown incorporated with a magnetic bremsstrahlung laser as described, for example, in U.S. Pat. No. 3,822,410 issued to J. M. J. Madey on July 2, 1974, and herewith incorporated by reference. The magnetic bremsstrahlung laser typically includes an electron beam source 11 which directs an electron beam into an active region 13 which is immersed in a constant, spatially periodic, transverse magnetic field B. The kinetic energy of the electron beam is converted by stimulated emission to radiative energy which is given up to a coaxial line 15 which guides the electromagnetic wave at the active region 13, and the radiation is collected at a radiation collector 17. The resonator illustrated in FIG. 3 (azimuthal deformation) is used in preference to any other embodiment thereof.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In an electromagnetic wave gyrotron oscillator of the type which produces radiation by direct conversion of the kinetic energy of an electron beam to radiative energy, the oscillator including an active region where an interaction between the electron beam and an electromagnetic wave takes place and a transmission line for guiding the electromagnetic wave at the active region,
   means for perturbing the transmission characteristics of the transmission line along the zero electric field lines of a wave mode at which the oscillator is desired to operate, to provide a high Q factor to the desired wave mode and a low Q factor to other wave modes which may compete with the desired wave mode.

2. The oscillator recited in claim 1 wherein the perturbing means includes:
   an azimuthal deformation of the transmission line, the azimuthal deformation having an axial coordinate z satisfying the relation $$z = L_n$$

where $L_n = n(\lambda_z/2)$, n is an integer, $\lambda_z$ is the axial wavelength of the wave mode at which the oscillator is desired to operate, and z is measured from the input plane of the transmission line.

3. The oscillator recited in claim 1 wherein the perturbing means includes:
   a plurality of elements periodically spaced apart in the axial direction of the transmission line by $\lambda_z/2$ where $\lambda_z$ is the axial wavelength of the wave mode at which the oscillator is desired to operate.

4. The oscillator recited in claim 1 wherein the perturbing means includes:
   an axial deformation of the transmission line, the axial deformation having an azimuthal coordinate satisfying the relation $$\phi = m\pi/n$$

where
   n is an integer, and
   m = 0, 1, 2, ..., 2n−1.

5. The oscillator recited in claim 1 wherein:
   the perturbing means extends outside the active region.

6. The oscillator recited in claim 1 wherein transmission line includes:
   a coaxial line.

7. The oscillator recited in claim 6 wherein the perturbing means includes:
   a corrugation of the center conductor of the coaxial line.

8. The oscillator recited in claim 6 wherein the perturbing means includes:
   highly conductive fins disposed on the center conductor of the coaxial line.

9. The oscillator recited in claim 6 wherein the perturbing means includes:
   lossy material disposed on the center conductor of the coaxial line.

10. In an electromagnetic wave cyclotron resonance maser oscillator of the type which produces radiation by direct conversion of the kinetic energy of an electron beam to radiative energy, the oscillator including an active region where an interaction between the electron beam and an electromagnetic wave takes place and a transmission line for guiding the electromagnetic wave at the active region,
   means for perturbing the transmission characteristics of the transmission line along the zero electric field lines of a wave mode at which the oscillator is desired to operate, to provide a high Q factor to the desired wave mode and a low Q factor to other wave modes which may compete with the desired wave mode.

11. In an electromagnetic wave magnetic bremsstrahlung laser oscillator of the type which produces radiation by direct conversion of the kinetic energy of an electron beam to radiative energy, the oscillator including an active region where an interaction between the electron beam and an electromagnetic wave takes place and a transmission line for guiding the electromagnetic wave at the active region,
   means for perturbing the transmission characteristics of the transmission line along the zero electric field lines of a wave mode at which the oscillator is desired to operate, to provide a high Q factor to the desired wave mode and a low Q factor to other wave modes which may compete with the desired wave mode.

* * * * *